(12) United States Patent
Pelissier et al.

(10) Patent No.: US 6,496,503 B1
(45) Date of Patent: Dec. 17, 2002

(54) DEVICE INITIALIZATION AND OPERATION USING DIRECTED ROUTING

(75) Inventors: Joseph E. Pelissier, Hillsboro, OR (US); William H. Swortwood, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/323,050

(22) Filed: Jun. 1, 1999

(51) Int. Cl.[7] .......................... H04L 12/28; H04L 12/56
(52) U.S. Cl. ..................................................... 370/389
(58) Field of Search ................................. 370/254, 255, 370/256, 257, 258, 229, 230, 230.1, 231, 235, 236.2, 356, 389, 395.1, 395.21, 395.31, 408, 422

(56) References Cited

U.S. PATENT DOCUMENTS

| | | | |
|---|---|---|---|
| 5,282,201 A | * | 1/1994 | Frank et al. ................. 370/403 |
| 5,422,878 A | * | 6/1995 | Kimoto et al. ............... 370/401 |
| 5,432,907 A | * | 7/1995 | Picazo et al. ................ 370/401 |
| 5,504,742 A | * | 4/1996 | Kakuma et al. ............. 370/399 |
| 5,541,911 A | * | 7/1996 | Nilakantan et al. ......... 370/255 |
| 5,802,042 A | * | 9/1998 | Natarajan et al. ........... 370/255 |
| 5,859,846 A | * | 1/1999 | Kim et al. ............. 370/395.62 |

* cited by examiner

*Primary Examiner*—Wellington Chin
*Assistant Examiner*—William Schultz
(74) *Attorney, Agent, or Firm*—Antonelli, Terry, Stout & Kraus, LLP

(57) ABSTRACT

A method of device initialization in a network is provided. An explicitly routed management cell is received at a device. The management cell includes initialization information, such as an address or a forwarding database. The management cell also includes information specifying an explicit route for the cell to traverse to reach the device. The device is initialized based on the initialization information in the received management cell. One or more subsequent cells are routed through the device using the more efficient destination address routing technique after the device is initialized.

19 Claims, 6 Drawing Sheets

| | Outbound, not at end of explicit route | Inbound, not at end of explicit route | Outbound at end of explicit route[4] | Inbound at end of explicit route[5] |
|---|---|---|---|---|
| DA | Permissive | Permissive | DMAC | SMAC |
| SA[1] | Current device's address | Current device's address | Current device's address | Current device's address |
| Hop Pointer | Increment | Decrement | No change | No change |
| Rpath () | If Hop Pointer≥1, Rpath(Hop Pointer) is set to port number cell was received on[2] | No change | Rpath(Hop Pointer) is set to port number cell was received on | No change |
| Forward To | Ipath(Hop Pointer) | Rpath(Hop Pointer) | If DMAC is current device's address, then don't forward.[3] Otherwise, forward based on DA and forwarding database | If SMAC is current device's address, then don't forward.[3] Otherwise, forward based on DA and forwarding database |

Notes:
1. If an address has not been assigned, use the permissive destination address.
2. Hop Pointer refers to the value of Hop Pointer before it is incremented.
3. In this case the cell has reached its final destination, i.e., there is no subsequent routing of the cell required.
4. End of explicit route portion is indicated by Hop Pointer ≥ Hop Count.
5. End of explicit route portion is indicated by Hop Pointer = 0.

Explicit Route Processing

FIG. 5

DEVICE INITIALIZATION AND OPERATION USING DIRECTED ROUTING

CROSS-REFERENCE TO RELATED APPLICATIONS

The subject matter of this application is related to the subject matter of U.S. patent application Ser. No. 09/322,152 filed on May 28, 1999 entitled "Method For Directing the Route of a Cell Transiting A Network."

FIELD

The invention generally relates to data networks and in particular to a technique for initializing or configuring devices or switches in a network.

BACKGROUND

In computer networks, data cells are generally routed using one of two methods. The first method involves the insertion of a "destination address" in the cell. Each switch or device within the network contains a forwarding database (also known as a routing table). This forwarding database contains an entry for each known destination address along with information related to how the cell is to be routed. The forwarding database usually lists an output port corresponding to each known destination address. This method requires that the forwarding database be configured before cells can transit the network. This configuration may be accomplished by a central configuration device or by various algorithms that permit each of the devices, with the cooperation of adjoining devices, to learn routes throughout the network.

The second method is explicit routing. In this method, the entire route that a cell is to transverse is explicitly stated within the cell. Each switch or device forwards the cell based on the information within the cell. Consequently, the devices within the network are not required to maintain forwarding databases.

A major limitation of destination address routing is the requirement of each device within the network to contain a configured forwarding database before data communication can take place. To achieve this, complex algorithms are required that allow each device to learn the topology of the network and to make appropriate forwarding database entries. Alternatively, a central device can configure the network; however, this is complicated by the fact that methods must be provided for the central device to learn the topology of the network without the network functioning. A second limitation is additional network complexity (redundancy) to provide network fault tolerance. Many networks are configured with multiple paths between points on the network. In this way, if a link fails, cells maybe routed along alternate paths maintaining communication in the presence of the fault. With destination address routing, complex algorithms must be provided to detect such faults, and to determine alternate routes around the faults. The time required to perform these functions, referred to as network convergence time, may be unacceptably long for certain applications.

Explicit routing eliminates the need to configure devices within a network to enable communication. However, explicit routing requires significantly increased processing by the communicating devices. This is due to the fact that an originating device must maintain information regarding the entire route between itself and the final destination. Furthermore, network efficiency is reduced since the entire route must be carried within the cell. And finally, network performance may be reduced since the intervening devices must examine more data within the cell before a forwarding decision can be made.

Therefore, a need exists for a more flexible technique for routing cells through a network which provides the advantages of both the destination address routing and explicit routing techniques.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and is not limited thereto. The spirit and scope of the present invention being limited only by the terms of the appended claims.

The following represents brief descriptions of the drawings, wherein:

FIG. 5 is a table illustrating the processing of directed route fields during the explicit route processing according to an example embodiment of the present invention.

DETAILED DESCRIPTION

Figure 1:
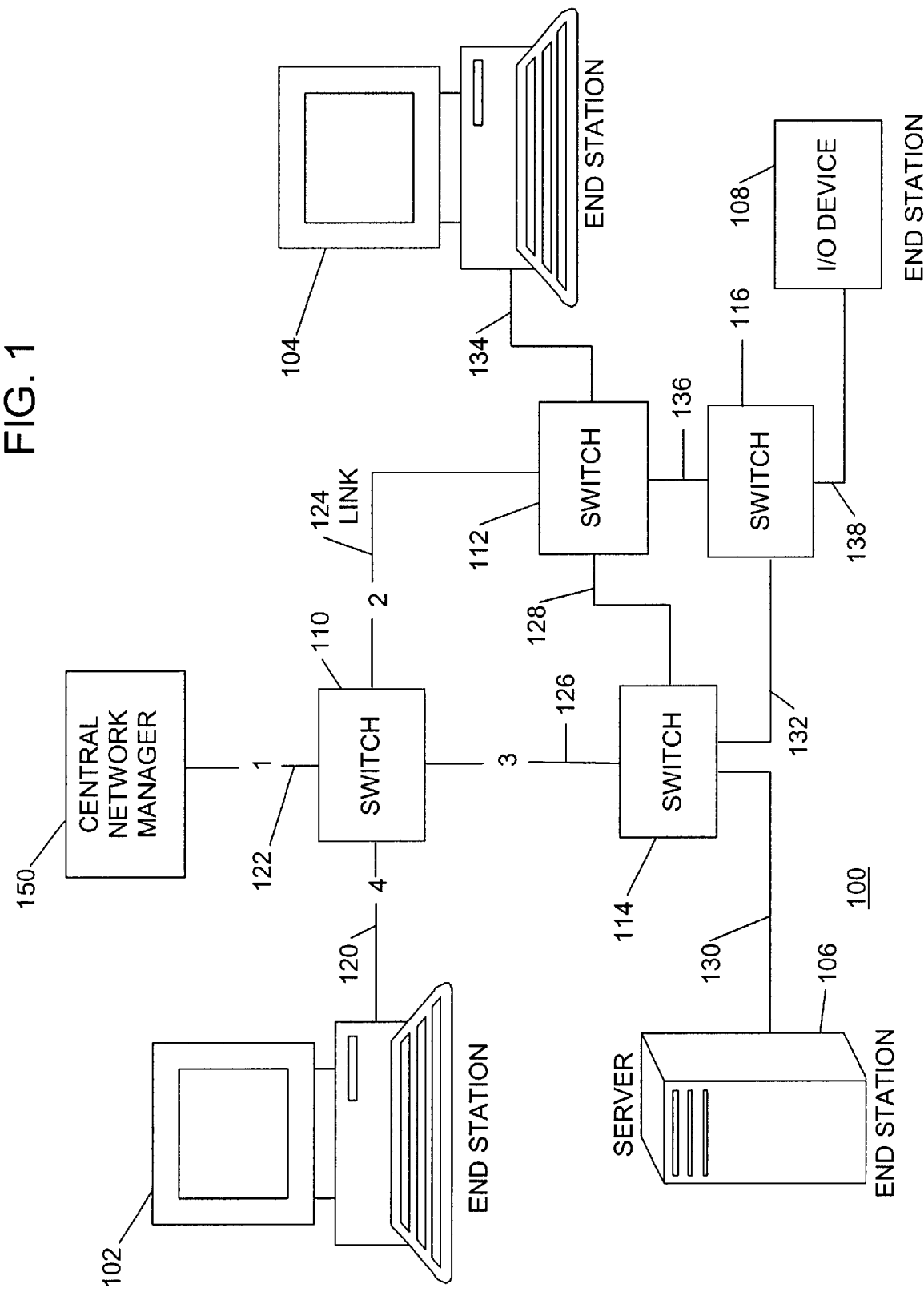
FIG. 1 is a block diagram illustrating a network according to an example embodiment of the present invention.

According to an embodiment of the invention, one or more devices in a network are initially unconfigured or un-initialized. That is, the devices in the network power-up without individual addresses assigned to them and without a forwarding database (as examples). To permit the use of simpler and less expensive switches or devices in the network, each device is not responsible for learning the topology of the network or generating their own forwarding databases. Rather, a central network manager is responsible for discovering the topology of the network, assigning addresses to each device, generating forwarding databases for each device, and then initializing each device by providing the assigned address and the forwarding database to each device for storage.

For the central network manager to perform its various management functions, a technique must be provided that allows the central network manager to route management cells throughout a network or fabric whose configuration is unknown. The more efficient destination address routing technique cannot be reliably used to route cells in an unconfigured or partially configured network because some or all of the devices in the network do not yet have a forwarding database.

The present invention allows the central network manager to route management cells to specific devices in an unconfigured or partially configured network using explicit routing to initialize or configure each device. After the devices in the network have been configured or initialized, subsequent cells can be routed through the newly configured devices using the more efficient destination address routing technique because each device now has a forwarding database. Thus, the present invention allows the appropriate routing technique to be selected based on the particular situation.

After the switch or device is initialized, cells may be routed through the device using either explicit routing or destination address routing. As described herein, the phrase "directed routing" refers to a hybrid technique that allows a cell to be routed using explicit routing, destination address routing or a combination of both techniques, according to an embodiment of the invention.

According to an embodiment of the invention, a cell (e.g., including a cell header) may include several variables or fields that are used for the directed routing through the network. These fields include a destination address (DA) that is used to specify either destination address routing or explicit routing. Other fields in the directed route cell include a Direction field, which is set to 0 for outbound cells and set to 1 for inbound cells. In general, outbound cells are initially generated cells. Inbound cells are cells that are generated in response to outbound cells that typically follow the reverse explicit path through the network. The fields in the directed route cell can also include a list of ports in IPath( ) defining an outbound explicit route. A list of explicit ports RPath( ) defining a return or inbound explicit path or route is populated or generated by devices (e.g., switches) along the outbound explicit route.

The address in the DA field may be either a specific address of a target or destination device (indicating that the cell should be destination address routed) or a permissive destination address (indicating that the cell should be explicitly routed). The permissive address is a predetermined global address that is interpreted by devices in the network as being explicitly addressed to it.

When a cell is received at a switch, the address in the DA field is provided to the device's forwarding database, if the switch has been initialized. The forwarding database returns a port number corresponding to the address. If the address in the DA field is the address of another device in the network, the cell is destination address routed by sending the cell out the port returned by the forwarding database. If the address is the permissive address or matches the address of the switch itself, the cell is provided to the switch's management entity for explicit route processing, regardless whether the device has been initialized. In explicit route processing, the management entity examines several variables and may forward the cell to the next hop of an explicit route or may reset the DA field to a final destination address (indicating destination address routing should be used) if the cell is at the end of an explicit route that is followed by a destination address route.

Referring to the figures in which like numerals indicate like elements, FIG. 1 is a block diagram illustrating a network according to an embodiment of the present invention. Network 100 may be a system area network (SAN), local area network (LAN), or other data network or packet switched network. Network 100 includes several end stations including computers 102 and 104, a server 106 and an input/output (I/O) device 108, which may be a hard disk drive, a tape drive, a CD ROM, etc. The end stations provided in the network 100 can be a wide variety of computers, servers, I/O devices or other devices. The specific end stations shown in FIG. 1 are provided only as examples.

The network 100 also includes a plurality of switches. The various switches and end stations are interconnected via links. A link is a bidirectional communication path between two connect points (e.g., switches or end stations) in the network 100. Each switch includes one or more ports each connected to an end point of a link. For example, switch 110 includes ports 1, 2, 3 and 4 which are numbered in FIG. 1. The switches relay or forward cells between the links using explicit routing and/or destination address routing.

Switch 110 is connected to end station 102, switch 114 and switch 112 via links 120, 126 and 124, respectively. Switch 114 is also connected to end station 106, switch 116 and switch 112 via links 130, 132 and 128, respectively. Switch 112 is also connected to switch 116 and end station 104 via links 136 and 134. Switch 116 is also connected to end station 108 via link 138. The specific number and configuration of end stations, switches and links of FIG. 1 is provided simply as an example network according to an embodiment of the present invention. Network 100 may include any number of end stations, switches and links. The collection of links and switches in the network may be referred to as a fabric.

A central network manager 150 is connected to switch 110 via link 122 for learning the network topology and calculating the forwarding databases for each switch, initializing or configuring each of the switches including loading or assigning their MAC addresses and loading their forwarding databases, detecting and managing faults or link failures in the network and performing other network management functions. Central network manager 150 could be provided as a separate device that is connected to one or more switches, could be included in a switch or could a be a software application that runs on one of the computers or end stations. Alternatively, one or more of these management functions can be performed in a distributed manner by a plurality (or all) of the switches, but this would require each switch to include greater processing capacity. For example, rather than having a central network manager 150 calculate and download forwarding databases for each switch, each switch can separately learn the topology of the network and generate its own forwarding database. Central network manager 150 may also be referred to as a fabric manager because it manages the various switches and links within the fabric.

Figure 2:
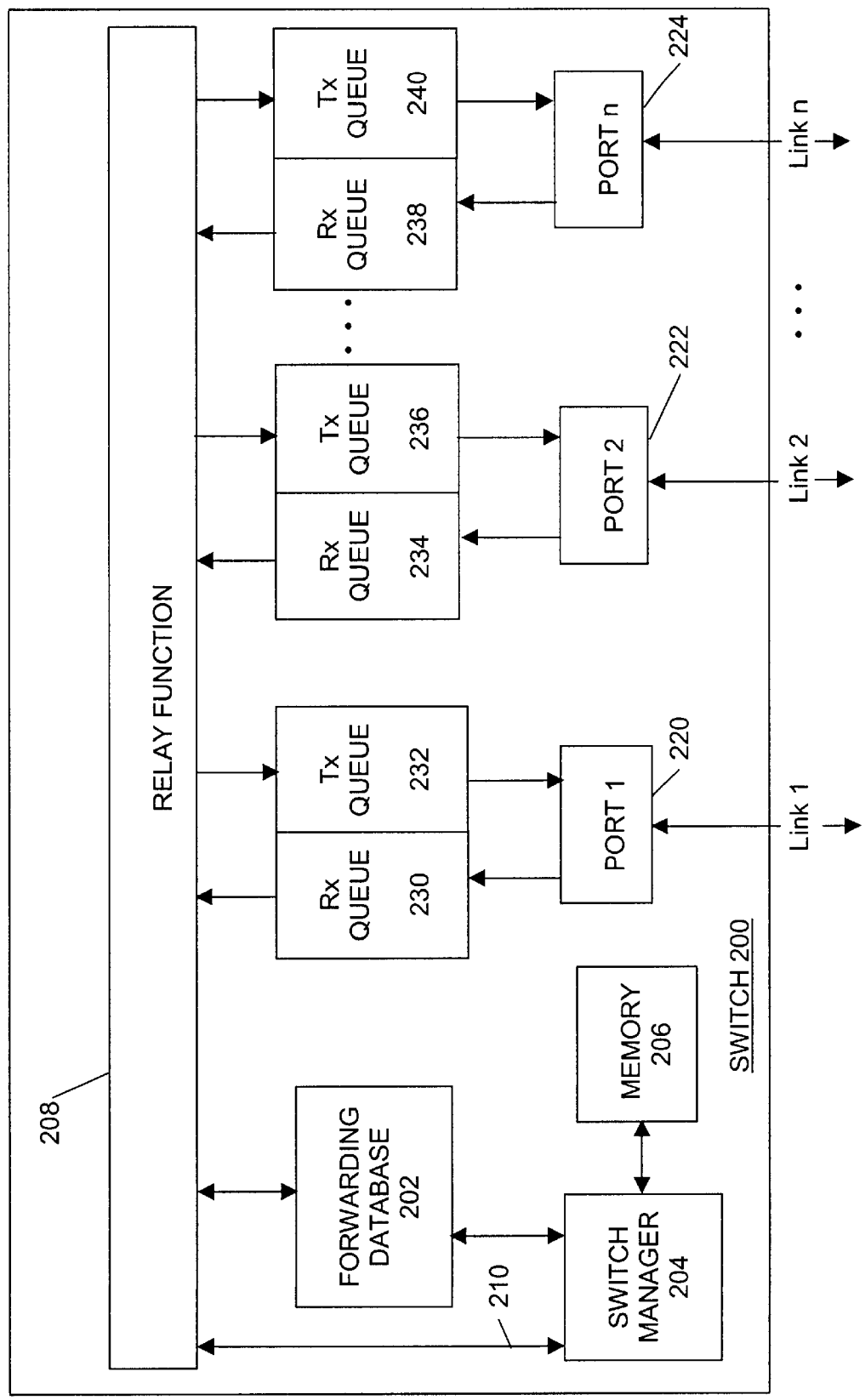
FIG. 2 is a block diagram illustrating a switch according to an example embodiment of the present invention.

FIG. 2 is a block diagram illustrating a switch according to an embodiment of the present invention. Switch 200 includes a switch manager 204 (which may be logic or a processor) for managing certain functions of the switch 200, a memory 206 connected to the switch manager 204 and a forwarding database 202 (also known as a routing table). A relay function 208 is also provided for relaying received cells to specific destination ports. Switch 200 also includes a plurality of ports, including ports 1–n (shown as ports 220, 222 and 224 in FIG. 2). Receive (Rx) and transmit (Tx) queues are connected between the relay function 208 and each port. Rx queue 230 and Tx queue 232 are connected to port 1, Rx queue 234 and Tx queue 236 are connected to port 222, and Rx queue 238 and Tx queue 240 are connected to port n.

Switch manager 204 communicates (e.g., via the network or any other channel) with central network manager 150 (FIG. 1) to receive information for switch initialization (e.g., to receive the switch address) and to receive and download the forwarding database. Switch manager 204 also controls the forwarding or relaying of cells during the explicit route of the directed route. Each switch also includes its own unique forwarding database 20 202. The forwarding database 202 indicates a destination port for each destination address (e.g., network address or Medium Access Control or "MAC" address) and is used to forward cells using destination address routing. Each switch includes its own unique address. According to an example embodiment, the switch address is actually the address that identifies the switch manager 204.

Directed Routing

Directed routing provides a hybrid method of specifying the route of a cell that addresses the limitations stated above. A directed routed cell may be routed using destination address routing, explicit routing, or a combination of the two.

The destination address routing may be used for the majority of the cells once the network has been configured and is operational. In this way, the communicating devices are freed from the tasks of maintaining routes. Furthermore, cells transition the network more efficiently since forwarding decisions may be made after examining only a small portion of the cell, i.e., the destination address.

An explicit routing mechanism is provided for network configuration, initialization (e.g., assigning network addresses to switches or devices) or re-initialization, fault detection or other circumstances. This greatly simplifies the determination of network topology within a network whose forwarding databases have not been configured or when the databases are in an unknown state. Explicit routing can be used by the central network manager 150 to forward management cells throughout an unconfigured or partially unconfigured network 100. A mechanism is also provided to easily generate a return route. Thus, other devices in the network can easily generate return messages to the central network manager 150.

The two methods can be combined to provide efficient means of initializing devices in the network, detecting faults in the network, of detecting topology changes, and to make appropriate changes to the forwarding databases as a result. For example, a central network controller or device can send management cells through various explicit routes through the network back to itself, and can identify failed links based on which cells returned successfully. As a further example, using the hybrid approach, a cell may be routed using the destination address and the forwarding databases to a particular point in the network. Then an explicit partial route within the cell is followed to a second point in the network. Finally, the cell is once again routed based on a new destination address from the second point to its final destination.

According to an embodiment of the present invention, there are two components that support the directed routing mechanism: the permissive destination address and the explicit route. The permissive destination address is simply a predetermined global address that is recognized by all (or at least many) devices in the network as indicating that the cell is to be processed as if it was explicitly addressed to the device. The explicit route is an explicit list of port numbers that a cell is to traverse during the explicit phase of its transition through the network.

Frequently, explicit routing is only required though a small portion of the network, or only under certain circumstances (e.g., to assign a network address to a specific switch or device, or to download a forwarding database to a switch or device). Therefore, the directed routing algorithm provides a method to utilize the more efficient destination routing on either side of the explicit route, as an example. There are many sub-classes of directed routes, for example:
Explicitly routed from source device to destination device.

Destination address routed from source device to intervening device. Explicitly routed from intervening device to destination device Explicitly routed from source device to intervening device. Destination address routed from intervening device to destination device.

Destination address routed from source device to intervening device. Explicitly routed from intervening device to second intervening device. Destination address routed from second intervening device to destination.

According to an embodiment of the present invention, directed routing can use several variables that are carried in the cell (e.g., carried in the cell header). These are defined as follows:

DA (destination address): This is initialized to the destination address of the first device in the explicit route portion of the directed route. If the first device encountered is to start the directed route portion (i.e. there is no initial destination routing portion), then this may be set to the permissive destination address. During the explicit route portion of the directed route, this is set to the permissive destination address. During the final destination address route portion of the directed route, if it exists, this is set to the address of the final destination.

SA (source address): This is initialized to the address of the device initiating a cell. It is updated with the address of any device forwarding the cell along the explicit route portion of a directed route.

Direction: Set to 0 for outbound cells. Set to 1 for inbound cells. In general, outbound cells are initially generated cells. Inbound cells are cells that are generated in response to outbound cells that must follow the reverse path through the network.

Hop Pointer: Identifies current hop in the cell's explicit route. Initialized to 1 for outbound cells or initialized to Hop Count for inbound cells. If Direction=0, incremented by 1 by each device forwarding the cell along the explicit route. If Direction=1, decremented by 1 by each device forwarding the cell along the explicit route.

Hop Count: Number of hops in the explicit path.

SMAC (Network or MAC source address): The address of the originating device of the cell.

DMAC (Network or MAC final destination address): The address of the final destination of the cell.

IPath( ): A list of ports defining the outbound explicit route. The number of entries in this list is Hop Count.

RPath( ): Return path. A list of ports defining the inbound explicit path. Used to direct the cell when Direction=1. When Direction=0, an entry is made by each forwarding device along the explicit outbound path indicating the port on which the cell was received.

Overall Operation of a Switch

The overall operation of a switch according to an embodiment of the present invention will be briefly described. Referring to FIG. 2, when a device (e.g., switch) receives a cell over a link, the cell is received through a port and is temporarily stored in a Rx queue. The relay function 208 copies the destination address in the DA field and forwards it to the forwarding database 202. The forwarding database 202 returns a destination port corresponding to the address in the DA field. The address in DA is typically either an address of a device (either this device or another device) or the permissive address. The permissive address is a predetermined global address that is interpreted by devices in the network as being explicitly addressed to it (e.g., as being addressed to its switch manager 204).

If the address in the DA field is the permissive address (or the actual address of the switch itself), then the forwarding database 202 will return the port pre-assigned to the switch manager 204 because the permissive address is interpreted by each switch as being specifically addressed to its switch manager 204. The relay function 208 then relays the cell to memory 206 for processing by the switch manager 204 if the destination address in the DA field is the Permissive address or if the port number returned from the database 202 matches the port number pre-assigned to the switch manager 204. The switch manager 204 then processes the cell to forward or relay the cell using explicit routing if the cell is not at the end of an explicit route, as described in detail below in connection with FIG. 3.

Otherwise, if the destination address in the DA field of the cell is not the permissive address (or is not the address of the switch itself), the relay function 204 transfers the cell into the Tx queue of the port number specified by the forwarding database 202. The cell is then forwarded out to a link via the corresponding port identified by the forwarding database (i.e., forwarded based on destination address routing). As a result, a cell can transit a network using one or both of destination address routing and explicit routing, depending on the address provided in the DA field and other variables in the cell.

Initiating a Directed Route Cell

To initiate a directed route cell, the initiating device must initialize the directed route variables.

The Direction field is set to zero. This specifies that the cell is outbound.

DA is set to the address of the first device in the route that is to execute the directed route algorithm. The initiator must ensure that the forwarding databases are sufficiently loaded in all devices between itself and the beginning of the directed route to deliver the cell. Furthermore, if a response or return cell is expected, the reverse route must also be loaded by the time the initial cell reaches its final destination. If the directed route is to commence at the first device encountered, then the DA is loaded with the permissive destination address.

SA is set to the address of the cell initiator. If an address has not been assigned, then it is set to the permissive destination address.

Hop Pointer is set to 1.

Hop Count is set to the number of hops in the explicit route portion.

SMAC is set to the address of the cell initiator. If an address has not been assigned, then it is set to the permissive destination address.

DMAC is set to the address of the final destination of the cell. If an address has not been assigned, then it is set to the permissive address. Also, if the final destination is at the end of the explicit route (i.e. there are no subsequent switched segments in the route), then DMAC may be set to either the address of the final destination or to the permissive destination address. Again, if there are destination address routed segments subsequent to the explicit route portion, then forwarding database entries appropriate to the route must be loaded in intervening devices and an address must be assigned to the destination.

IPATH( ) is an array containing Hop Count entries. It is initialized to the port number to which the cell is to be forwarded for each device in the explicit path or route.

RPATH( ) is an array of Hop Count entries used to contain the explicit return path. It is initialized to all zeros.

Directed Route Return Cell Initialization

Frequently, a device will need to return a cell in response to receiving one. The directed routing mechanism provides a straightforward mechanism for accomplishing this. As the cell traverses the network outbound, an additional array, RPATH( ), is populated by each switch along the explicit route. Each switch along the explicit route inserts the port number from which the cell was received into RPath( ). As a result, a return route (e.g., to the central network manager 150, FIG. 1) is established.

Several fields are re-initialized prior to returning a cell along the return route. The Direction field is set to one. This specifies the inbound path. Hop Count, SMAC, DMAC, IPath( ), and RPath( ) are copied from the initial cell into the return cell. The Hop Pointer is set to Hop Count.

In general, the DA field in the return cell header is set to the SA from the initial cell header. The SA in the return cell header is set to the DA field in the initial cell header (i.e., DA and SA are simply swapped from the initial cell header to the return cell header). The return cell is then forwarded out the port from which the initial cell was received.

Flowchart for Directed Routing

Figure 3:
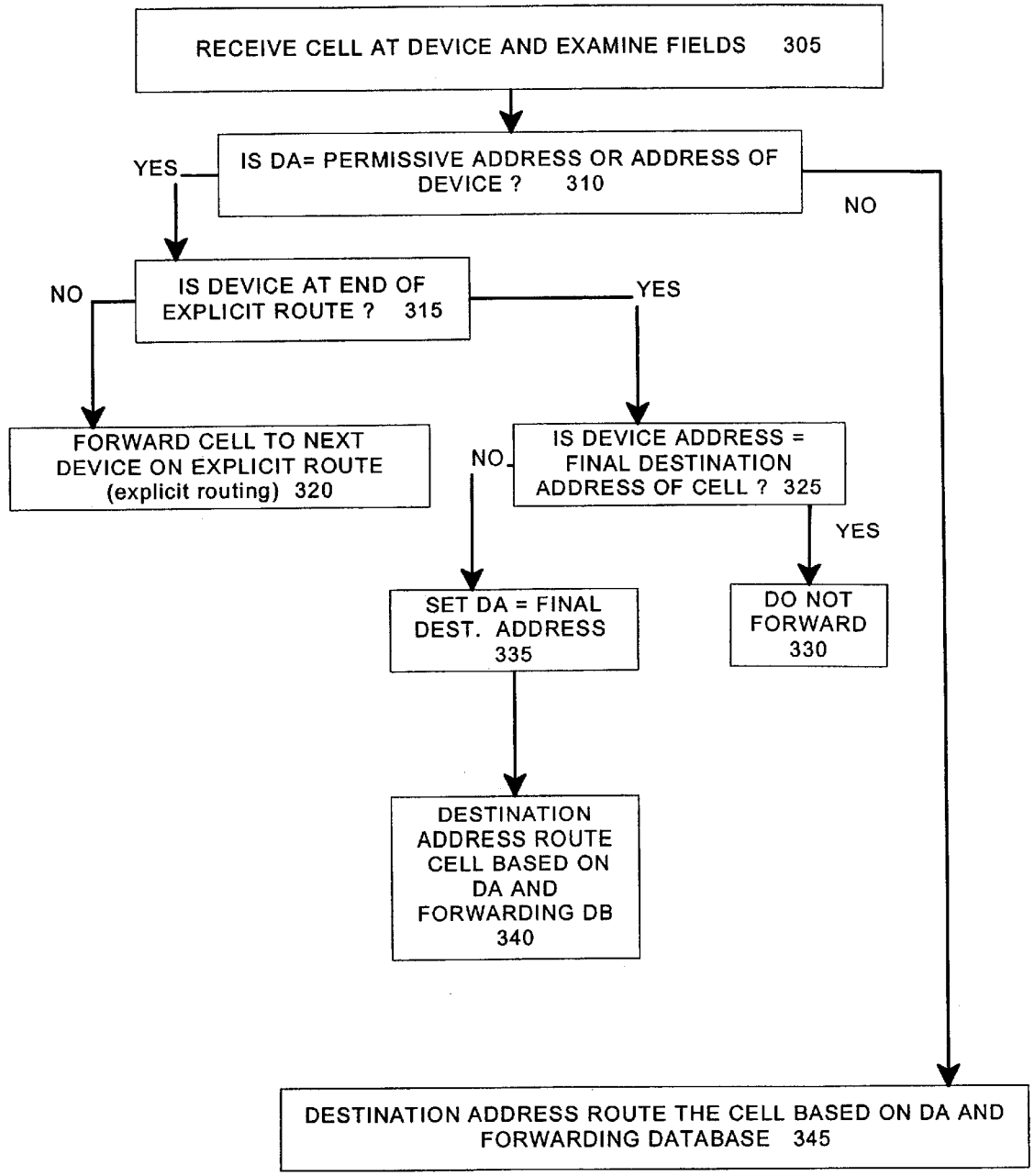
FIG. 3 is an example flowchart for cell processing at each device or switch according to an embodiment of the present invention.

FIG. 3 is a flowchart for the cell processing that occurs at each device or switch as the cell transits the network, according to an embodiment of the present invention. At block 305, the cell is received and the fields in the cell are examined.

At block 310, the switch determines if the address in the DA field is equal to either the permissive address or the address of the device itself. If not, the cell is destination address routed based on the address in the DA field and the device's forwarding database, block 345.

At block 310, if the address in the DA field is equal to either the permissive address or the address of the device itself, flow proceeds to block 315. At block 315, the device determines whether the cell is at the end of the explicit route. If the cell is not at the end of the explicit route, the cell is forwarded to the next device on the explicit route, block 320. The explicit route is specified by IPath( ) for outbound cells and by RPath( ) for inbound cells.

If the cell is at the end of the explicit route, at block 325 the device determines whether the device address is equal to the final destination address (e.g., DMAC for outbound cells, and SMAC for inbound cells). If the device address matches the final destination address, the cell has reached its finals destination and is not forwarded, block 330.

If the cell has not reached its final destination, the device sets the DA field to the final destination address, step 335, and then destination address routes the cell based on the DA field and the device's forwarding database, step 340.

Example Cell Format

Figure 4:
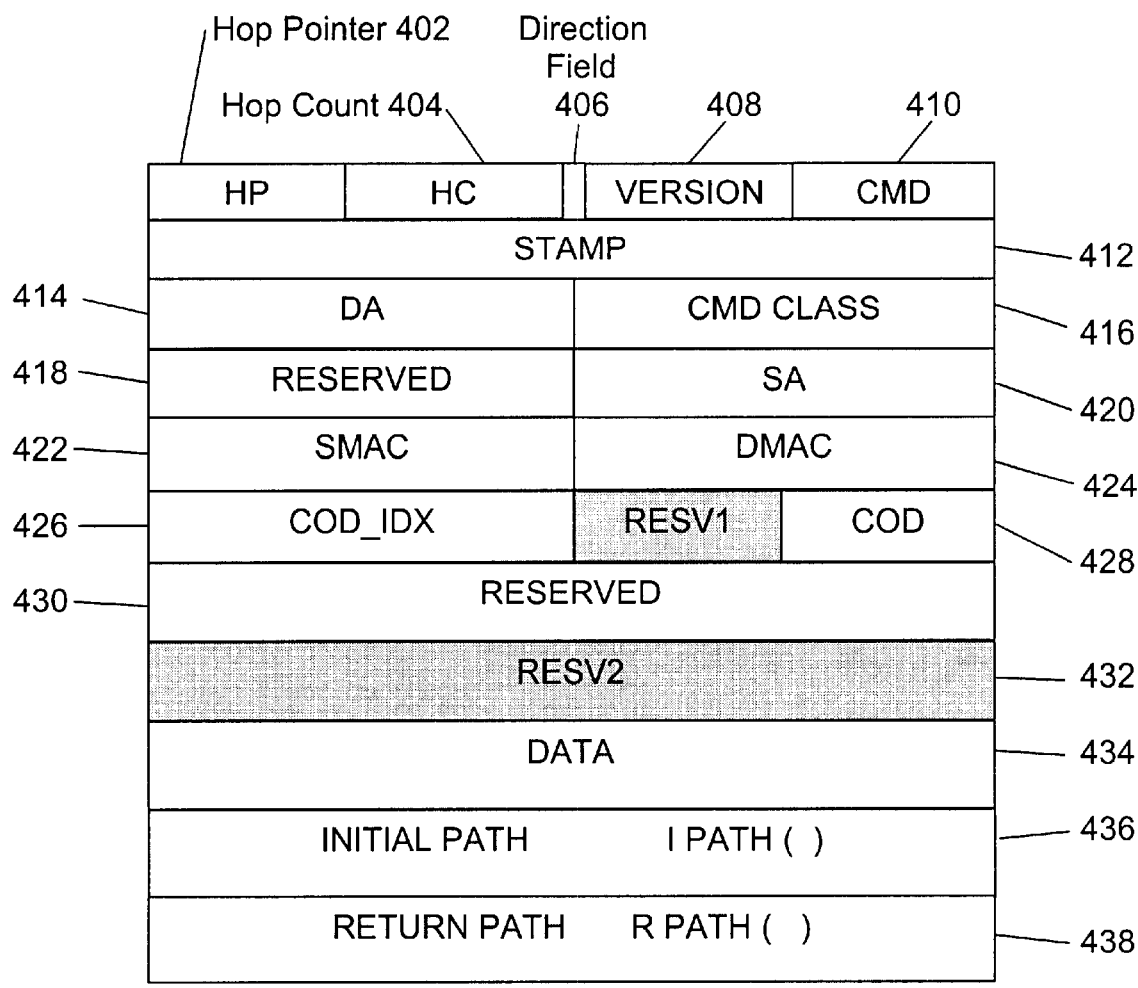
FIG. 4 illustrates an example cell format according to an embodiment of the present invention.

FIG. 4 illustrates an example cell format according to an embodiment of the present invention. There may be at least two types of cells routed through a network, both of which may be routed using either explicit routing or destination address routing. There are data cells which are standard cells carrying data directed to a particular destination device or computer. There are also management cells which are typically sent from the central network manager 150 for performing any of several network management functions (e.g., device initialization, topology discovery). A management cell can be used to query or update data objects in a targeted device. A data object is a group or collection of data in the device which may be accessed as a unit, such as a forwarding database or a MAC address for the device. FIG. 4 illustrates an example of a cell that could be used for either a data cell or a management cell.

Referring to FIG. 4, the example cell 400 includes a Hop Pointer (HP) 402, a Hop Count (HC) 404, a Direction field 406, a DA field 414, SA field 420, a SMAC field 422, a DMAC field 424, an IPath( ) field 436 and an RPath( ) field 438, which are described above. Fields 418 and 432 are reserved.

The example cell 400 includes a Version field 408 which identifies a version of the software being used, a command (CMD) field 410 which describes a command or operation that is being performed (e.g., for management cells), a Data field 434 for providing data and a Command Class (CMD CLASS) field 416 which identifies the class for the command. Examples of commands include Get( ) and Set( ). The Get( ) command can be used to read or query a data object from devices, while Set( ) can be used to update a data object in a device.

Cell 400 also includes a Common Object Descriptor (COD) 428 which identifies the data object which will be operated on in the target device as specified by the command. Thus, the COD identifies the collection of data (i.e., the data object) which will be queried or updated in the target device. COD examples include a MAC_address (specifying the address of the device), a DevGUID (the globally unique identifier that identifies the device), NumPorts (indicating the number of ports in the device), DevType (indicating the device type, such as switch) and the FDB (the device's forwarding database). All of this information is stored in a device or switched and may be queried or updated by specifying the object using the appropriate COD. Some data objects in a device, such as the device's MAC address and the forwarding database, can be both read (queried) or updated (written to). While other data objects (such as the device's globally unique identifier or GUID) may be a read-only object. According to an embodiment of the invention, the MAC address of the device and the forwarding database of a device can be set or updated only by the central network manager 150. The new data used to update or initialize a data object in a target device is provided in the Data field 434.

The central network manager 150 can read (or query) a device's address by specifying the Get( ) command and the MAC_address COD in a management cell, or can update or initialize a device's MAC address by specifying the Set( ) command and the MAC_address COD in the cell (providing the new MAC address for the device in the Data field 434). Likewise, a central network manager 150 can read or query a device's forwarding database using the Get( ) command and specifying the FDB COD, and update or initialize a device's forwarding database using the Set( ) command and the FDB COD (providing the updated forwarding database in the Data field 434 of the management cell). A wide variety of commands and CODs may be used to perform many types of management functions on different data objects in a device. Some examples have been described above, but the present invention is not limited to these examples.

Where a data object includes several entries, a COD index (COD_IDX) field 426 can be used to index to a specific entry within the data object. An example is a forwarding database which specifies a port number for each of a plurality of destination addresses. Thus, using the FDB COD and a specific number for the COD_IDX, the central network manager 150 can query or update a single entry in a device's forwarding database.

Cell 400 also includes a Stamp field 412. The Stamp is a unique identifier used in management cells that is used by a requester. A cell sent as a response or a reply to an initial management cell will contain the same stamp as the initial cell. In this manner, the Stamp identifies the initial management cell from the central network manager 150 or initiating device and the corresponding reply cell returned to the central network manager 150 or the initiating device. FIG. 4 illustrates only one example of a cell format, and the present invention can be practiced with cells having a variety of formats and fields.

Explicit Route Processing

Explicit route processing according to an example embodiment of the present invention will now be described. Explicit route processing is performed (e.g., by the switch manager 204, FIG. 2) if the address in the DA field of the cell is either the permissive address (or predetermined global address) or matches the specific address of the device. Otherwise, if the address in the DA field does not match the device's address or the permissive address, explicit route processing is not performed and the cell is routed using destination address routing based on the address in the DA field and the device's forwarding database.

According to an embodiment of the invention, the address of the device is actually the address assigned to the switch manager 204. If the address in the DA field matches the address of the switch manager 204 or is the permissive address, the forwarding database returns the port number assigned to the switch manager 204. The cell is then relayed to the switch manager 204 for explicit route processing.

Pseudo code of the explicit route processing is given below for an example embodiment of the present invention:

```
If Direction=0 and Hop Pointer<Hop Count Then
    DA←permissive address
    If device address is assigned Then
        SA←device address
    Else
        SA←permissive address
    End If
    If Hop Pointer≧1 Then
        RPath(Hop Pointer)←port number cell received on
    End If
    Hop Pointer←Hop Pointer+1
    Forward cell to port IPath(Hop Pointer−1)
Else If Direction=0 and Hop Pointer≧Hop Count
    DA←DMAC
    If device address is assigned Then
        SA←device address
    Else
        SA←permissive address
    End If
    RPath(Hop Pointer)←port number cell received on
    If DMAC≠device address Then
        forward cell to port based on DA
    End If
Else If Direction=1 and Hop Pointer≧1 Then
    DA←permissive address
    If device address is assigned Then
        SA←device address
    Else
        SA←permissive address
    End If
    Hop Pointer←Hop Pointer−1
    Forward cell to port RPath(Hop Pointer+1)
Else If Direction=1 and Hop Pointer=0 Then
    DA←SMAC
    If device address is assigned Then
        SA←device address
    Else
        SA←permissive address
    End If
```

```
If SMAC≠device address Then
    forward cell to port based on DA
End If
End If
```

As can be seen from the pseudo code above, the processing required for each management entity along an explicit route portion of a directed route depends on two things: whether the cell is inbound or outbound, and whether the cell is at the end of the explicit route portion.

Referring to the pseudo code, when a cell is received at the management entity, the management entity (e.g., switch manager 204) first examines the Direction field and the Hop Pointer. A Direction=0 indicates an outbound cell, while a Direction=1 indicates an inbound (or return or reply) cell. IPath( ) contains the port numbers specifying the explicit outbound path, while RPath( ) contains the port numbers for the explicit inbound path. The Hop Pointer is compared to the Hop Count to determine if the cell has reached the end of the explicit route portion of the directed path.

If the cell is outbound and has not reached the end of the explicit path (Hop Pointer is less than Hop Count), the permissive address is stored in the DA field, and the SA field is updated with the address of the current device (if the address of the current device is unknown, then the permissive address is used for SA). If the Hop Pointer is greater than or equal to 1, then the port number on which the cell was received is stored in RPATH(Hop Pointer). The Hop Pointer is then incremented to two and then the cell is forwarded using explicit route processing to port IPath(Hop Pointer).

If the cell is outbound and has reached the end of the explicit route portion of the directed route (Hop Pointer is greater than or equal to Hop Count), the final destination address DMAC is stored in the DA address field, and the SA field is loaded with the address of the current device if known (otherwise, permissive address is used for SA). Then, the port number on which the cell was received is stored in RPath(Hop Pointer). If the final destination address DMAC does not match the address of the device, the cell is then forwarded using destination address routing based on the final destination address (which is stored in DA). Otherwise, if there is a match between DMAC and the device's address, the cell has reached its final destination and is not forwarded.

If the cell is inbound (Direction=1) and the cell is not at the end of the explicit path (Hop Pointer is greater than or equal to 1), then the permissive address is copied to the DA field and the current device's address (if known) is copied to SA (otherwise the permissive address is copied to SA). The Hop Pointer is decremented and the cell is then forwarded using explicit routing to port RPATH(Hop Pointer+1).

If the cell is inbound and the cell is at the end of the explicit path (Hop Pointer=0), then the address in SMAC is copied to DA and the address of the current device is copied to SA (if known, otherwise the permissive address is used for SA). If SMAC (indicating the final destination of the inbound cell) is equal to the address of the current device, this indicates that the cell has reached its final destination. If SMAC is not equal to the address of the current device, the cell is then forwarded using destination address routing based on the address stored in DA (SMAC was just copied into DA). A match between SMAC and the device's address indicates that the return cell has reached its final destination and is not forwarded.

FIG. 5 is a table which summarizes the processing of some directed route fields during the explicit route processing. During the explicit route processing, the Direction, Hop Count, SMAC, DMAC, and IPATH fields are not changed.

Referring to the first column of FIG. 5, for outbound cells (cells that are initially generated, e.g., management cells from the manager 150) and where the receiving switch is not at the end of the explicit route, DA in the cell is set (or maintained) as the permissive address and SA is set to the current device's network address (e.g., MAC address). Also the RPATH( Hop Pointer) is set to the port number on which the cell was received (prior to incrementing Hop Pointer) if Hop Pointer is greater than or equal to 1. The Hop Pointer is then incremented (because this is an outbound cell), and the cell is then forwarded to the port specified by IPATH (Hop Pointer) based on the incremented Hop Pointer.

As shown in the third column of FIG. 5, if the switch which receives the outbound cell is the last switch of the explicit route (the end of the explicit route), DA in the cell is set to DMAC (the final destination address), SA is set to the current device's network address (if known), the RPATH (Hop Pointer), is set to the port number of the switch on which the cell was received. The Hop Pointer is not incremented. If the DMAC matches this device's network address, then the cell has reached its final destination and is not forwarded. Otherwise, if the DMAC does not match the device's address, the cell is forwarded by the relay function 208 (FIG. 2) using destination address routing based on DA in the cell (which has been set to DMAC) and the forwarding database 202 (FIG. 2) of the switch.

Referring to column 2 of FIG. 5, if the received cell is an inbound cell (a cell generated in response to another cell) and the switch is not at the end of the explicit route (end of the explicit route is indicated by Hop Pointer=0), DA is set or maintained as the permissive address (indicating that the cell should continue to be explicitly routed using RPATH), SA is set to the current device's network address, the Hop Pointer is decremented, and the cell is forwarded to the destination port specified by RPATH(Hop Pointer+1), which corresponds to the port specified by RPATH prior to decrementing Hop Pointer.

Referring to column 4 of FIG. 5, if the received cell is inbound and received at a switch that is at the end of an explicit route (Hop Pointer=0), DA is set to SMAC so that the cell will be destination routed from the switch by the relay function 208 based on the address SMAC of the device or end station that generated the original cell. SA is set to the current device's address (if known, otherwise the permissive address is used). If SMAC is the current device's network address, then the cell has reached its final destination and the cell is not forwarded. Otherwise, if SMAC does not match the current device's network address the cell is forwarded by the relay function 208 (FIG. 2) of the switch using destination address routing based on DA (which has been set to SMAC) and the forwarding database 202 of the switch.

Device Initialization/Configuration

According to an embodiment of the invention, devices in the network are initially unconfigured or un-initialized. That is, the devices in the network power-up without specific MAC addresses assigned to them (i.e., without MAC addresses assigned to their Switch Managers 204) and without a forwarding database. According to an embodiment of the invention, the devices power-up with the permissive address initially assigned to the switch manager 204. A hardware vendor may provide a Device GUID or other device information in the device, which may be read or queried by manager 150 even before the device is initialized.

According to an embodiment of the present invention, to permit the use of simpler and less expensive switches or devices in the network, each device is not responsible for learning the topology of the network or generating their own forwarding databases. Rather, the central network manager 150 is responsible for discovering the topology of the network, assigning MAC addresses to each device, generating forwarding databases for each device, and then downloading or providing the forwarding database to each device for storage. In addition, the network topology can change when devices or communication links are added, removed or relocated, when communication links or devices fail, etc. As such, the central network manager 150 may periodically rediscover the network topology, reassign MAC addresses to devices, and generate updated forwarding databases for each device based on the new network topology.

For the central network manager 150 to perform its various management functions, an explicit routing technique is provided that allows manager 150 to route management cells throughout a network or fabric whose configuration is unknown (e.g., an unconfigured or partially configured network). As described above, explicit routing allows the central network manager 150 to specify a specific route, based on a list of port numbers provided in the IPath( ) field in the management cell. The target device can respond to the central network manager 150 using explicit routing based on the RPath( ) field that is populated during the transit of the initial cell. After the devices in the network have been configured or initialized using management cells routed using explicit routing, subsequent cells (e.g., management cells and/or data cells) can be routed through the newly configured devices using the more efficient destination address routing technique because each device now has a forwarding database.

Figure 6:
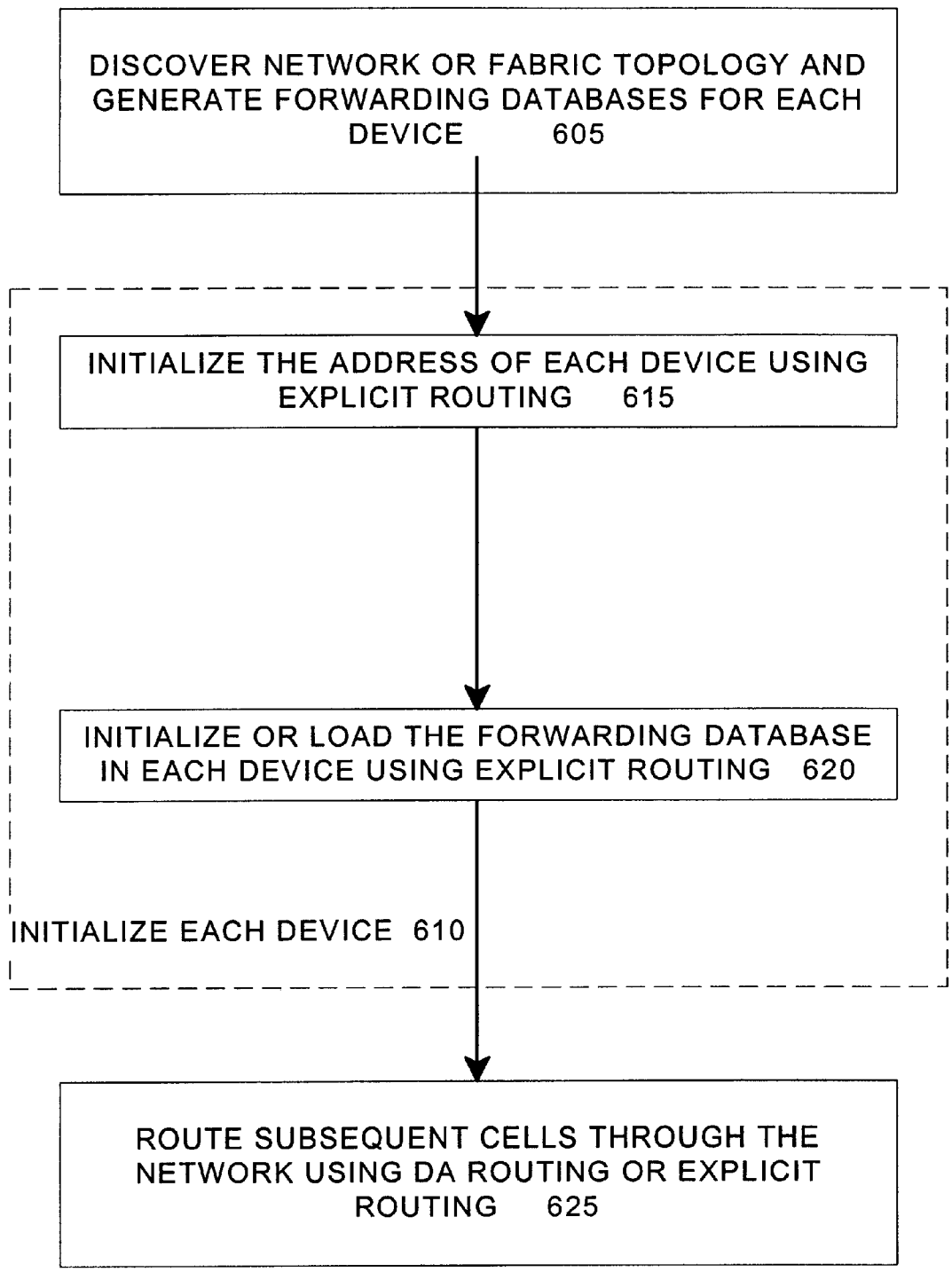
FIG. 6 is a flow chart illustrating a process of network initialization according to an example embodiment of the present invention.

FIG. 6 is a flow chart illustrating a process of network initialization according to an example embodiment of the present invention.

At block 605, the central network manager 150 (FIG. 1) discovers the topology of the network and then generates a forwarding database (or routing table) for each device in the network. Central network manager 150 may discover the network topology using a variety of different techniques, and may use management cells routed using explicit routing for this purpose. For example, central network manager 150 may use Dijkstra's Algorithm, the Bellman-Ford Algorithm, the Spanning Tree Algorithm, or other types of algorithms to generate the forwarding databases for each of the devices in the network. The central network manager 150 also assigns network addresses to each device (e.g., MAC addresses).

At block 610, the central network manager 150 initializes (or configures) each device in the network using explicit routing. This block may include several steps or blocks, including blocks 615 and 620.

At block 615, the central network manager 150 (FIG. 1) initializes the address of each device (i.e., the address of a switch manager 204, FIG. 2, in each device) in the network using explicit routing. According to an embodiment of the present invention, the central network manager 150 may initialize the address of the switch manager 204 of a device using an explicitly routed management cell by providing the explicit route for the cell in the IPath( ) field 436 (FIG. 4), setting the DA field 414 to the Permissive address, specifying the Set( ) command in the CMD field 410 and by setting the COD field 428 in the cell to MAC_address. Other fields in the management cell will be initialized as described above for an outbound cell. The new MAC address for the device (assigned to the switch manager 204) is carried in the Data field 434 (FIG. 4) of the management cell.

According to an embodiment, the address of the switch manager 204 (FIG. 2) of each device is initially set to the Permissive address at power-up, and each device does not include a forwarding database. As such, the various unconfigured (or un-initialized) devices in the network can route cells using explicit routing because a cell having a DA field set to the Permissive address will be forwarded to the switch manager 204 of the device because the address of the switch manager 204 is set to the permissive address. The cell will then be forwarded using explicit routing until the cell reaches the end of the explicit route. The unconfigured (or un-initialized) device will be unable to route cells using destination address routing because no forwarding database has yet been stored.

At block 620, the central network manager 150 (FIG. 1) initializes the forwarding database in the network using explicit routing. According to an embodiment of the present invention, the central network manager 150 may initialize the forwarding database 202 (FIG. 2) in the device using an explicitly routed management cell by providing the explicit route for the cell in the IPath( ) field 436 (FIG. 4), setting the DA field 414 to the Permissive address, specifying the Set( ) command in the CMD field 410 and by setting the COD field 428 in the cell to FDB (to specify that the forwarding database object should be updated). Other fields in the management cell will be initialized as described above for an outbound cell. The new or updated forwarding database is carried in the Data field 434 (FIG. 4) of the management cell.

At block 625, after each cell in the network has received its forwarding database, cells may be routed through such devices using either explicit routing or destination address routing. According to an embodiment, explicit routing is used to initialize one or more devices in an unconfigured or partially configured network. Once the devices in the network are configured or initialized, the more efficient destination address routing can be used to route cells.

Several embodiments of the present invention are specifically illustrated and/or described herein. However, it will be appreciated that modifications and variations of the present invention are covered by the above teachings and within the purview of the appended claims without departing from the spirit and intended scope of the invention. As used herein, the term "cell" is used to mean a collection of data that is transmitted as a single unit, and is not limited to an Asynchronous Transfer Mode (ATM) cell or the like. Rather the term "cell" encompasses any type of data unit, such as a packet, datagram, cell, etc. Also, while some of the addresses refer to Medium Access Control (MAC) addresses, such as DMAC and SMAC, it should be understood that any type of network addresses can be used, such as Internet Protocol (IP) addresses, ATM addresses, etc.

What is claimed is:

1. A method of device initialization in a network comprising:

receiving an explicitly routed management cell at a device, the management cell including initialization information and information specifying an explicit route for the cell to traverse to reach the device;

initializing the device based on the initialization information in the received management cell; and routing one or more cells through the device using destination address routing after the device is initialized.

2. The method of claim 1 wherein the management cell further includes a predetermined global address.

3. The method of claim 1 wherein the initialization information comprises a network address assigned to the device.

4. The method of claim 1 wherein the initialization information comprises a forwarding database for the device.

5. The method of claim 1 wherein said initialization information comprises a network address assigned to the device and a forwarding database for the device.

6. The method of claim 5 wherein said initializing the device comprises:
   initializing the address of the device using the received network address assigned to the device; and
   initializing a forwarding database in the device using the received forwarding database.

7. A method of device initialization in a network comprising:
   assigning a network address to a device;
   generating a forwarding database for the device;
   sending an explicitly routed management cell to the device, the management cell including information specifying an explicit route for the cell to traverse to reach the device, the network address assigned to the device and the forwarding database for the device;
   receiving the explicitly routed management cell;
   initializing an address of the device and a forwarding database for the device based on the received management cell; and
   routing one or more cells through the device using destination address routing using the forwarding database after the device is initialized.

8. The method of claim 7, further comprising generating an explicit return path as the cell traverses the explicit route to the device, the explicit return path allowing the device to send a return cell.

9. The method of claim 7 wherein the management cell includes a command specifying an update or initialize function.

10. The method of claim 9 wherein said management cell further comprises a descriptor that identifies at least one data object in the device to be initialized or updated, the descriptor identifying at least one of a network address assigned to the device or a forwarding database for the device.

11. A program encoded on a machine readable medium for initializing a device, the program causing the following to be performed when executed: receiving an explicitly routed management cell at a device, the management cell including initialization information and information specifying an explicit route for the cell to traverse to reach the device;
   initializing the device based on the initialization information in the received management cell; and
   routing one or more cells from the device using destination address routing after the device is initialized.

12. A device for routing cells in a network using either explicit routing or destination address routing, each cell including a first address and a final destination address, the device comprising:
   a plurality of ports, each port connected to a link;
   a receive queue and a transmit queue coupled to each port;
   a forwarding database which stores cell routing information corresponding to each of a plurality of addresses only after the device has been initialized;
   a relay entity coupled to the queues and the forwarding database, the relay entity obtaining routing information from the forwarding database based upon the first address and relaying the cell to the port specified by the routing information if the first address is not a predetermined global address or an address of the device;
   a management entity coupled to the relay entity, the relay entity relaying the cell to the management entity for explicit routing if the first address in the cell is a predetermined global address or the address of the device, the management entity receiving an explicitly routed management cell having the first address set to the predetermined global address and providing a forwarding database for initializing the device.

13. The device of claim 12 wherein management entity comprises a switch manager.

14. A network comprising:
   a plurality of devices coupled to each other, one of said devices being un-initialized;
   a central network manager coupled to the devices, the central network manager sending an explicitly routed management cell to the one device, the management cell comprising initialization information and information specifying an explicit route for the cell to traverse to reach the device, the initialization information including a forwarding database for the one device, the explicitly routed cell being received at the one device and the one device being initialized by storing the received forwarding database;
   the central network manager routing one or more cells to a destination device through the one device, the one device routing the one or more cells using destination address routing based on the forwarding database after the one device has been initialized.

15. The network of claim 14 wherein the one device comprises:
   a plurality of ports, each port connected to a link;
   a receive queue and a transmit queue coupled to each port;
   a forwarding database, the forwarding database storing cell routing information corresponding to each of a plurality of addresses only after the one device has been initialized;
   a relay entity coupled to the queues and the forwarding database; and
   a management entity coupled to the relay entity.

16. The method of claim 1, wherein the network comprises a plurality of devices arranged in a fabric, and wherein the method is applied to substantially every device of the plurality of devices to initialize the network.

17. The method of claim 7, wherein the network comprises a plurality of devices arranged in a fabric, and wherein the method is applied to substantially every device of the plurality of devices to initialize the network.

18. The program of claim 11, wherein the program is implementable in a network comprising a plurality of devices arranged in a fabric, and wherein the program operations are performed at substantially every device of the plurality of devices to initialize the network.

19. The network of claim 14, where the plurality of devices are arranged in a fabric and more than one device of the plurality of devices being un-initialized, the central network manager operative to perform the aforeclaimed operations for substantially every un-initialized device of the plurality of devices to initialize the network.

* * * * *